United States Patent [19]

Wells

[11] Patent Number: 4,984,344

[45] Date of Patent: Jan. 15, 1991

[54] MOTOR EXTENSION SHAFT REMOVAL TOOL

[75] Inventor: Richard C. Wells, Orlando, Fla.

[73] Assignee: Ralph Bidwell, Orlando, Fla. ; a part interest

[21] Appl. No.: 426,726

[22] Filed: Oct. 26, 1989

[51] Int. Cl.[5] .................. B23P 19/04

[52] U.S. Cl. .................. 29/261

[58] Field of Search .................. 29/261, 262, 251, 260, 29/259, 266, 258, 257

[56] References Cited

U.S. PATENT DOCUMENTS

| | | | |
|---|---|---|---|
| 1,512,422 | 10/1924 | Hatcher et al. | 29/251 |
| 1,544,393 | 6/1925 | Hatcher et al. | 29/251 |
| 2,052,304 | 8/1936 | Kaplan | 29/262 |
| 2,375,391 | 5/1945 | Smith | 29/261 |
| 3,846,891 | 11/1974 | Elg | 29/261 |
| 4,019,233 | 4/1977 | Jirele | 29/261 |
| 4,463,489 | 8/1984 | James | 29/261 |
| 4,823,453 | 4/1989 | Bartlett | 29/261 |

*Primary Examiner*—Robert C. Watson

*Attorney, Agent, or Firm*—Duckworth, Allen, Dyer & Doppelt

[57] ABSTRACT

The extension shaft removal tool consists of one base tool with two combination lifter plates and is specifically designed to separate the automatic washer drive motor shaft from the extension shaft of the clutch assembly.

6 Claims, 2 Drawing Sheets

FIG. 2
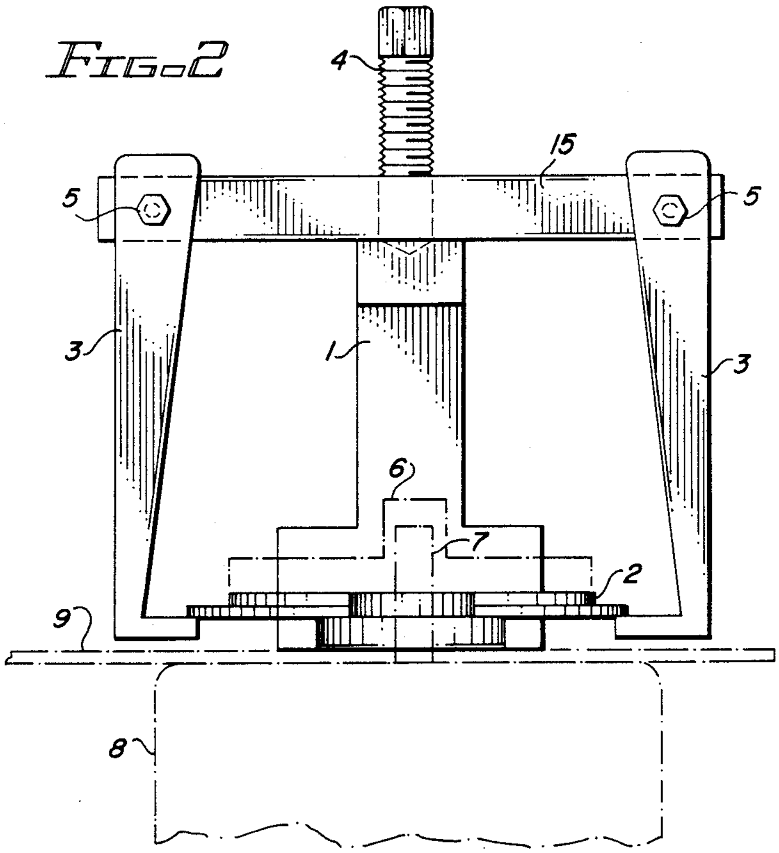
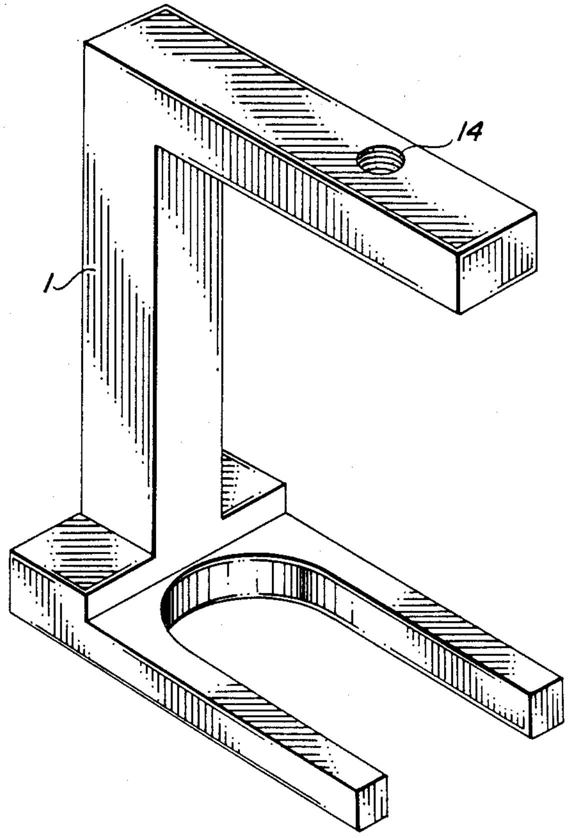
FIG. 3

MOTOR EXTENSION SHAFT REMOVAL TOOL

BACKGROUND OF THE INVENTION

The invention discussed herein specifically is a tool to remove the motor extension shaft from the main drive motor of a General Electric (G.E.) automatic washer, Hotpoint automatic washer, or any other automatic washer using a similar clutch and motor arrangement. The motor extension shaft, in combination with a clutch assembly, drives the automatic washer transmission. The main drive motor shaft is inserted into the motor extension shaft and secured in place with a U-bolt, block, and two lock nuts. After a period of use, rust and foreign particles tend to weld the union so that the main drive shaft is sealed to the inside of the motor extension shaft. This invention provides a method, by creating the tool necessary to remove the motor extension shaft within seconds and without damage to the motor extension shaft or the main drive motor shaft after the motor extension shaft removal tool is set in place.

SUMMARY OF THE INVENTION

The General Electric and Hotpoint Companies manufacture both a single-speed automatic washer that incorporates a single-speed clutch, and a two-speed automatic washer that incorporates a two-speed clutch. When the clutch or motor becomes defective and it is necessary for a service technician to replace the drive motor or replace the clutch, the motor extension shaft that attaches to the drive motor shaft must be removed. The procedures commonly used in the past, and at present, to remove the clutch is time consuming and often damages the drive motor shaft and/or the motor extension shaft. This results in added costs to the consumer when it is necessary to use replacement components when this damage occurs.

The need to find a more efficient method to remove the motor extension shaft brought about the development of the tool disclosed as the present invention.

During the 1950's, General Electric Company developed an automatic washer with a single-speed clutch and main drive motor. However, the wringer washer was still very popular. During this time, it had not become necessary to have a tool to remove the single-speed motor extension shafts used with a clutch. As the G.E. automatic washer became more popular, the number of washers to be repaired increased appreciably. When General Electric designed a two-speed automatic washer, the washer utilized a two-speed clutch that is quite difficult to remove without damaging the drive motor shaft and/or the extension shaft. The present invention provides a tool for the easy removal of the extension shaft from the main drive motor shaft without the usual damage to the extension shaft and/or motor shaft. The two-speed clutch has considerably more components that require more frequent service. At that time a tool such as the present invention was needed to remove the extension shaft but had not been available until applicant developed the present invention.

When applicant started his career in the major appliance repair field in the 1950's, there were no written procedures in the General Electric manuals, or any other manual, describing procedures for removal of the motor extension shaft from the main drive motor. Applicant researched the old style and the new style General Electric manuals, and other manuals, for any instructions on the removal of the G.E. motor extension shaft from the main drive motor. Applicant contacted the General Electric Company, Robinair Co., and many other tool distributors, and they advised such a tool to remove the G.E. motor extension shaft from the main drive motor was not available and, furthermore, no such tool had ever been available.

To reinforce applicant's findings, he called the local General Electric Service Manager in Orlando, Florida, and requested information regarding written procedures for the removal of the motor extension shaft from the main drive motor. The manager advised the applicant that he did not know of any written procedures. To further reinforce the applicant's findings, he called the General Electric Company's Product Service Office located in Atlanta, Georgia, (the Southern Operation Tech-Line.) General Electric personnel manning the Tech-Line have a good working knowledge of service procedures and the content of service manuals. In answer to a question asked by the applicant for written procedures for removing the G.E. automatic washer motor extension shaft from the main drive motor, Mr. Harris of the Tech-Line was unable to give applicant any written procedures. However, he proceeded to tell of three separate procedures that have been used since the 1950's and indicated they are the only accepted procedures presently being used. These instructions have been passed down by word-of-mouth from technician to technician and company to company. The three removal procedures were as follows:

1. Lubricate the main drive motor between the motor shaft and extension shaft and let it soak. Then lay the main drive motor horizontally, use a chisel or punch and with a hammer, tap the extension shaft off the main motor shaft.
2. Heat the motor extension shaft. Lay the main drive motor horizontally, use a chisel or punch and with a hammer, tap the extension shaft off the main motor shaft.
3. Drill a hole at the top of the motor extension shaft. Insert a metal object that will rest on the end of the main drive motor shaft. Use a bearing puller to exert an upward pressure on the extension shaft and a downward pressure on the drive motor shaft. Without proper equipment, the removal of the motor extension shaft could take at least two hours.

Any of these removal procedures can cause damage to the extension shaft or the main drive motor shaft or both.

The present invention provides a base tool and combination lifter plates to lift the G.E. motor extension shaft from the main motor shaft without lubricating, heating, or drilling holes in the motor extension shaft.

The present invention described herein eliminates any chance of damage to the G.E. automatic washer main drive motor and motor extension shaft by providing an easy and safe method for removing the motor extension shaft.

DESCRIPTION OF THE DRAWING

FIG. 2 is a frontal view of the present invention with the automatic washer motor shown in phantom.

FIG. 3 is a perspective view of the base tool.

DESCRIPTION OF THE PREFERRED EMBODIMENT

Figure 1:
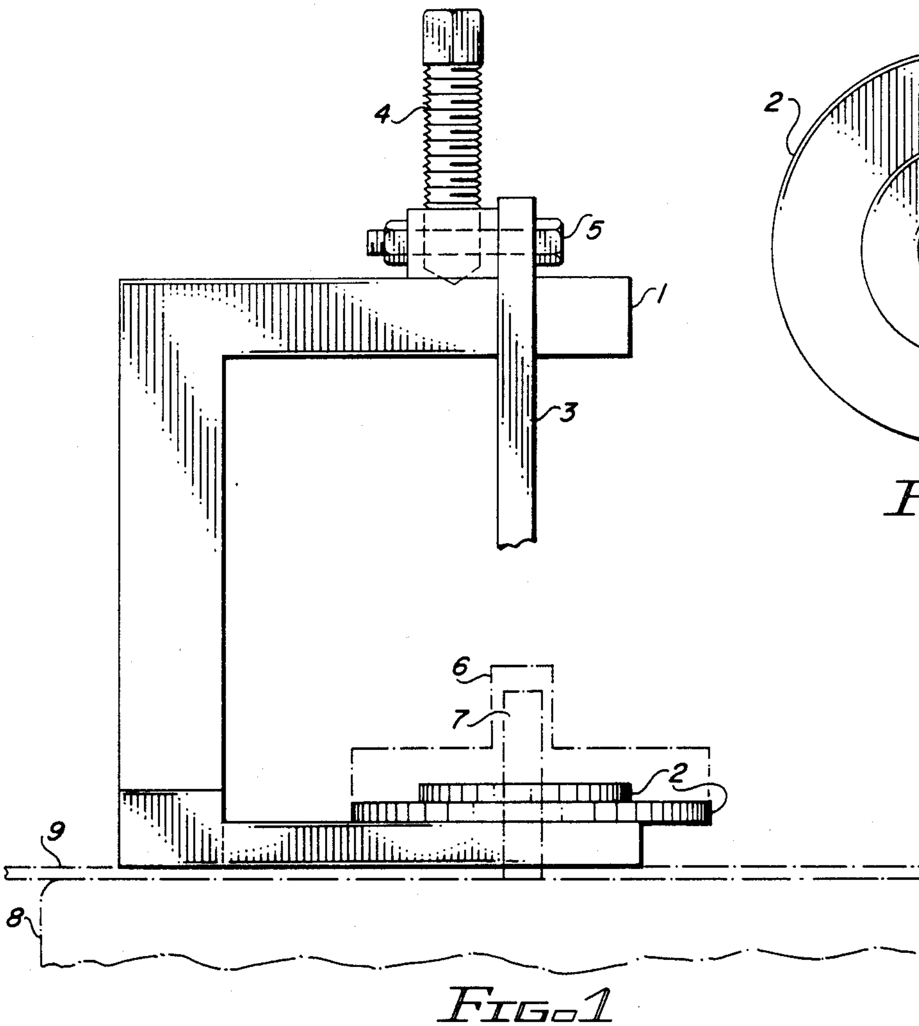
FIG. 1 is a side view of the present invention.

The base tool 1 provides a platform for the extension shaft puller to exert downward pressure against the motor base plate 9 (phantom shown by broken lines.) The base plate is secured to the top of the drive motor 8. As the downward pressure is applied by the extension shaft puller screw 4 to the top of the base tool 1, the pressure is transmitted to the bottom of the base tool 1. The bottom of the base tool applies downward pressure against the main drive motor base plate 9. This force will eliminate any downward pressure on the main drive motor shaft 7 and motor extension shaft 6. A concave indentation 14 is provided at the top of the base tool for the purpose of aligning the extension shaft puller. A lifting plate 2 is inserted under the motor extension shaft 6. The convex portion of the lifting plate 2 is designed to fit the corresponding indented portion on the bottom of the motor extension shaft 6. This design will exert upward pressure at the center of the extension shaft to protect the outer edges of the motor extension shaft 6.

Once the lifting plate 2 is in place, the base tool 1 can be positioned in place. The bottom of the base tool 1 will hold the lifting plate 2 in place. With the extension shaft puller screw 4, puller bar 15, and jaw bolt 5 in place, the extension shaft puller jaws 3 will lip under the lifting plate 2 and exert an upward pressure to remove the motor extension shaft 6 from the main drive motor shaft 7. The base tool 1 extends high enough to remove the motor extension shaft 6 from the main drive motor shaft 7. The bottom of the base tool 1 adds stability to the base tool and permits this tool to sit flat on the motor base plate 9.

Figure 4:
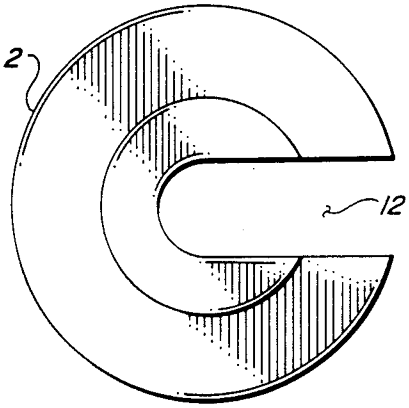
FIG. 4 is a top view of the single-speed lifter

The single-speed clutch lifter plate 2 is designed to lift two different styles of motor extension shafts. The lifter plate 2 with the indented portion in an upright position (as shown in FIGS. 1 and 2) will lift a circular based motor extension shaft. Turning the lifter plate 2 upside down with the indented portion facing downward will lift a flat-based oblong motor extension shaft. The opening 12 of the lifter plate 2 provides easy positioning of the lifter plate (see FIG. 4).

Figure 5:
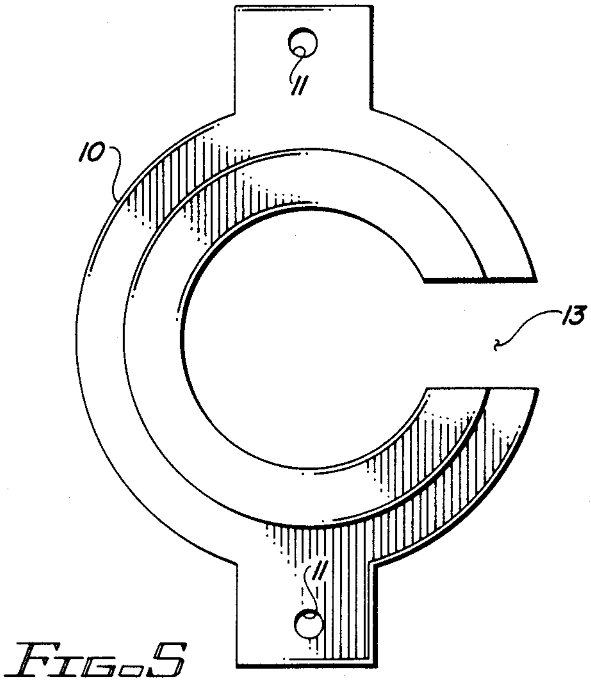
FIG. 5 is a top view of the two-speed lifter plate.
Figure 6:
FIG. 6 is a side view of the two-speed lifter plate.

The lifter plate 10 of FIGS. 5 and 6 is designed to lift a two-speed clutch extension shaft. A two-speed clutch is circular and has a larger diameter base than the single-speed clutch. The lifter plate 10 is designed with a wider indented portion to fit the corresponding indented portion of the two-speed extension shaft base. The ears of the lifter plate 10 extend to the outer edge of the extension shaft. The extension shaft ears provide a hole 11 to permit the extension shaft rivets to extend into the hole 11 to assure the lifter plate will exert upward pressure at the center of the extension shaft. The opening 13 of the lifting plate 10 provides easy positioning of the lifter.

What is claimed is:

1. A device for separating an automatic washer clutch assembly motor extension shaft from the main drive motor of an automatic washer comprising:

- a base tool having a U-shaped base with a bar at the closed portion of the U-shape angling up 90° and measuring longer than said motor extension shaft and then angling 90° back over said U-shaped base;
- a lifter plate that is circular in diameter with an indented portion at the center of the said lifter plate and having a slot extending from the outer edge to the center of the said lifter plate;
- a motor base plate adapted to be secured to the frame of said main drive motor;
- an extension shaft puller comprised of a single crossbar having a hole in the center for the passage of a puller screw and two jaws, each jaw located at an end of the crossbar and dimensioned to be engageable under said lifter plate;
- said base tool being dimensioned for sitting flat on said base plate with said U-shaped base dimensioned for extending on either side drive motor shaft and with the base tool extending up and over said main drive motor shaft and said motor extension shaft;
- said lifter plate being dimensioned for inserting under said motor extension shaft with the indented portion of said lifter plate fitting into a correspondingly indented portion of said motor extension shaft; and wherein
- said puller screw exerts downward pressure on said base tool, said extension shaft puller jaws lip under said lifter plate and exert upward pressure to raise said lifter plate and said motor extension shaft to separate said motor extension shaft from said main drive motor.

2. The device recited in claim 1 wherein said lifter plate is comprised of a structure independent of said base tool, whereby said lifter plate may be inserted under said motor extension shaft at different positions relative to said U-shaped base.

3. The device recited in claim 2 wherein said motor base plate is comprised of a structure independent of said base tool, whereby said motor base plate may be inserted under said motor extension shaft and said U-shaped base relative to said drive motor.

4. Apparatus for separating an extension shaft from a drive motor, in which said extension shaft is of the type having an indentation adjacent the central portion thereof, said apparatus comprising:

- a base tool having a U-shaped base dimensioned for positioning about said extension shaft;
- a lifter plate having a slot dimensioned for positioning said lifter plate between said U-shaped base and said extension shaft, said lifter plate having an indentation corresponding to the indentation of said extension shaft;
- a puller bar spaced from said U-shaped base and dimensioned to be positioned over the extremity of said extension shaft when said U-shaped base is positioned about said extension shaft;
- jaw means for coupling said puller bar and said lifter plate;
- means for moving said bar away from said U-shaped base, to cause said jaw means to pull said lifter plate together with said extension shaft away from said U-shaped base; and wherein
- said indentation in said lifter plate exerts pressure at the center of said extension shaft to protect the outer edges thereof.

5. In combination:

- a drive motor having an extension shaft with an indentation adjacent the central portion thereof;
- a base tool having a U-shaped base positioned about said extension shaft;
- a lifter plate positioned between said U-shaped base and said extension shaft, said lifter plate having an indentation corresponding to the indentation of said extension shaft;

a puller bar spaced from, and positioned over, the extremity of said extension shaft;

jaw means coupling said puller bar and said lifter plates;

means for moving said puller bar away from said extremity of said extension shaft to cause said jaw means to pull said lifter plate together with said extension shaft away from said U-shaped base; and wherein said indentation in said lifter plate engages and exerts pressure at said indentation of said extension shaft to protect the outer edges of said extension shaft.

6. The combination recited in claim 5 wherein said lifter plate is structurally independent of said U-shaped base and said extension shaft, whereby said lifter plate may be inserted under said motor extension shaft at different positions relative to said U-shaped base.

* * * * *